United States Patent
Ray

[11] 3,972,308
[45] Aug. 3, 1976

[54] APPARATUS FOR MOVING AND SELF-FEEDING OF LARGE HAYSTACKS

[76] Inventor: Daniel F. Ray, c/o Davis, McCaleb & Lucas, 230 W. Monroe St., Suite 2040, Chicago, Ill. 60606

[22] Filed: Oct. 3, 1974

[21] Appl. No.: 511,575

[52] U.S. Cl. .............................. 119/60; 214/512; 214/515; 214/766; 280/43.23
[51] Int. Cl.² .......................................... A01K 5/00
[58] Field of Search .......... 214/390, 144, 512, 352, 214/621, 766, 778; 280/43.23; 119/20, 58, 60

[56] References Cited
UNITED STATES PATENTS

| | | | |
|---|---|---|---|
| 2,686,494 | 8/1954 | Garman | 119/58 |
| 2,729,196 | 1/1956 | Breitenbach | 119/20 |
| 2,768,607 | 10/1956 | McClure | 119/60 |
| 2,777,590 | 1/1957 | Moriarty | 214/766 |
| 3,101,153 | 8/1963 | Verdery | 214/390 X |
| 3,336,908 | 8/1967 | Swanson | 119/60 |
| 3,570,694 | 3/1971 | Tantlinger | 280/43.23 |
| 3,851,624 | 12/1974 | Peak | 119/60 |
| 3,877,595 | 4/1975 | Edelman | 214/506 |
| 3,884,377 | 5/1975 | Holdeman | 214/767 |
| 3,892,202 | 7/1975 | Feterl | 119/60 |

*Primary Examiner*—Robert G. Sheridan
*Attorney, Agent, or Firm*—McCaleb, Lucas & Brugman

[57] ABSTRACT

A transportable feeder frame apparatus for enclosing and moving pre-formed haystacks in conjunction with a prime mover, such as a farm tractor; the same including means for elevating the stack for transportation to a desired feeding location, whereat the same is lowered to the ground, and the prime mover detached for use with additional frame means. The enclosing frame effectively controls self-feeding by livestock and prevents trampling of the feed materials to minimize waste.

1 Claim, 16 Drawing Figures

APPARATUS FOR MOVING AND SELF-FEEDING OF LARGE HAYSTACKS

BACKGROUND OF THE INVENTION

1. Field of the Invention

This invention relates to haystack feeding and moving apparatus, and more particularly to apparatus capable of allowing selective placement of large compacted haystacks within a stock feeding area for subsequent self-feeding by the animals.

2. Description of the Prior Art

Principally because of high labor costs, modern day cattle feeding operations have necessarily become more mechanized. Recent developments in hay production are rapidly eliminating use of wire or string bound hay bales, especially in large scale operations. Instead of the small tied-bales, large, tightly compacted yet unbound haystacks are used. One or two operators equipped with specialized equipment are able to grow, harvest, compact, move, store, and retrieve large quantities of hay. Because of this ongoing change in production techniques, significant handling problems have been encountered, particularly with respect to transportation and feeding of large feeder haystacks. Moreover, attempts at utilizing prior art tied-bale handling techniques for these large compacted haystacks have proven undesirable, if not unsuccessful.

It should be understood that large haystacks are preformed by specialized stack-forming machinery. Any of the currently fed ruminant loose feed materials such as clover hay, corn stover, alfalfa, quack grass, fescue, and timothy can be compressed into large haystacks. These large haystacks can weigh as much as three tons or as little as one and one quarter tons, the latter having length, width, and height dimensions of approximately eight, seven, and eight feet respectively, or approximately 2.4; 2.1; and 2.4 meters. By way of information, prior art apparatus typifying such stackforming devices are illustrated in the following United States patents:

3,556,327          3,698,767
3,732,672          3,779,158
        3,813,861

Because of the tremendous size and weight of compacted haystacks, very specialized and expensive machinery is required to move the haystacks from the storage lot or hayfield to the desired feeding location. Moving devices now on the market are of limited utility, i.e., they are only useful to transport a stack. Three known examples of such moving devices, all typically pulled by a drawing implement, include a wheeled flat bed device having mechanized longitudinal chain apparatus for conveyor-like pick-up and removal of a haystack; a wheeled lift fork device for the lifting and moving of smaller pre-formed haystacks, and sometimes having top-of-stack stabilizing means; and a wheeled stack retriever having a variable height loading bed. None of these devices provide self-feeding of the stacks, they simply move the stack.

Once the stacks are moved to the desired location, feeding becomes a problem. Although cattle feeders are able to use free-choice stack feeding, i.e., allowing the cattle to feed themselves from unenclosed, large haystacks, this method has proven extremely wasteful of stacked feed materials. Albeit free-choice feeding is the least expensive haystack feeding method, trampling wastes of such free-choice haystack feeding may amount to as much as fifty per cent. This is because cattle are able to walk on top of the unprotected haystack in their attempt to feed upon it, thereby trampling large amounts of the feed material. Because of this trampling waste problem concerning free-choice feeding, additional specialized apparatus is required after moving the stack to effect controlled self-feeding.

Generally, a self-feeding apparatus can be described as a device which allows livestock, such as cattle, to feed on and entirely consume a haystack, yet prohibits trampling waste. One example of a known self-feeding device is a series of portable feeder panels individually placed around a haystack and then secured with pins. Cattle are able to extend their head and necks through vertical bars or stanchions on each panel, thereby allowing the cattle to eat from the stack yet not walk on top of it. Other examples include electric fences, pole racks or fences, cable fences, sled-like rigid metal enclosures, and wheeled hayricks. Some of these devices are permanently affixed around the haystack. Others have to be manually decreased in size as a haystack is consumed. Still other devices rely on the cattle to forcibly collapse the self-feeder's walls inwardly around the dwindling haystack, thereby providing self-regulation of feeder size. While some of these devices have to be positioned in pieces around a large haystack and then assembled, others require the stack to be torn apart and the stack segments separately placed in the self-feeder. Each known teaching for providing an enclosure around the feed material requires additional labor not needed with utilization of the present invention. Moreover, the last described method effectively destroys the best single advantage of compacted haystack feeding, i.e., one single compacted mass of hay weighing, for example, one and one quarter tons is available for once-a-week feeding of a herd of cattle of approximately thirty head, compared to the currently used practice of once-a-day feeding of approximately ten tied bales for a similar size herd. Feeding devices typifying some of the foregoing are illustrated in the following United States patents:

2,686,494
2,729,196
2,768,607

Because of the above-described moving and feeding problems, it can readily be seen that a preferred practice of handling large haystacks for a herd of cattle would be to eliminate the two step moving and feeding operations or, alternatively, obviate the necessity of dividing a large haystack after it has been neatly and desirably compacted, and selectively depositing it in several small feeding pens. Such preferred practice may be accomplished according to this invention by an apparatus capable of moving a large haystack from the storage area to the desired feeding location and then retaining the stack within the same apparatus while cattle self-feed until the stack is, for all practical purposes, completely devoured. This eliminates trampling wastes and reduces overall costs.

SUMMARY OF THE INVENTION

The present invention concerns the handling of compacted large stacks of ruminant feed materials, by apparatus for effecting both the moving and self-feeding of such stacks to livestock, such as a herd of cattle, with one simple structure. This structure comprises a rigid, frame-like pen having at least one side operable to open for placement of the pen around a large haystack, elongated tongue members operable at the lowermost levels of the frame to provide support during lifting and movement of the haystack, height-adjustable wheel means for both lifting and transportation of the frame and the enclosed supported haystack, and implement connecting means operable to secure the overall structure to a prime-mover farm vehicle for effecting movement of the frame separately of or in conjunction with an associated stack.

In operation, this apparatus can be used to transport large haystacks to a feeding area by picking them up either at the stack storage area or where left in a hayfield after formation. Once placed around and forced under a haystack, the apparatus of the present invention is operable to lift the haystack and then transport it to the desired position. Support and transportation of the haystack is provided via the combination of the apparatus' wheel elements and elongated tongues incorporated in the base of the frame-like feeder structure. Once positioned at the desired feeding area, the haystack and feeder are lowered onto the ground, whereupon wheel elements may be left intact or, alternatively, removed for use with another feeder pen. The feeding animals, such as cattle and horses, for example, can then self-feed from the stack enclosed by this invention without being able to trample down and waste parts of the stack. Because of the portability of the present invention, only one apparatus is necessary to move and self-feed large haystacks thereby eliminating the necessity of utilizing two different devices as in the current art, one for moving and another for self-feeding. Moreover, because of its simple construction and dual purpose use, a cattle feeder's utilization of the apparatus of this invention results in overall reduced haystack handling costs since it obviates his purchasing both expensive mover devices and labor-consuming self-feeder devices.

Once cattle have completely devoured a large haystack contained within the apparatus of this invention, the apparatus can be reused, either by reassembling the portable wheel elements to the frame, or if the wheels have been retained in place during self-feeding, by raising the frame on the height-adjustable wheels, and moving the self-feeding apparatus to a storage area for another haystack.

An alternate embodiment of this invention provides an even less expensive overall stack handling system by utilizing a separable trailer-like moving element having height-adjustable wheels and extended lifting tongues. This trailer element is operable to provide lifting and support of a stack when it is frictionally interconnected to a feeder frame. The overall combination of moving and feeding apparatus of this alternate embodiment operates similarly to the one-piece preferred embodiment, and has the further advantage of being more economical for the cattle-feeder to effect stack handling, since only one moving element is required for multiple frame elements.

A significant labor-saving feature of this invention occurs in that a large compacted stack, once formed and deposited in the field by a stack-forming machine, need not be dismembered to provide sufficient hay in the proper size for placement in small pens or racks, as required with some prior art feeders. Rather, the large haystack is retained intact, forcibly encompassed by the present invention, moved to the desired feeding location, and self-fed, with the result being that a cattle feeder can handle large haystacks in one continuous operation.

The present invention has as one of its more important objects, the provision of apparatus for the combined transporting and self-feeding of large haystacks.

The invention has as another object the provision of a novel device for maintenance-free self-feeding of large haystacks whereby a herd of animals may feed themselves without the attention of the operator and with no resulting trampling wastes.

A still further object of this invention is the provision of a combination apparatus having both moving and feeding elements whereby the moving elements can be utilized with any of a multiple series of similar feeding elements.

A further object of this invention is the provision of a moving and self-feeding apparatus for large haystacks wherein the apparatus is of simple construction and has minimal initial, operational, and maintenance costs.

This invention has as another object the provision of a large haystack feeding and moving apparatus capable of attachment to any commonly available tractor-type prime mover without the necessity of specialized connection means.

Other objects, features, and advantages of the present invention will become apparent from the subsequent description and the appended claims, particularly when taken in conjunction with the accompanying drawings, in which:

DESCRIPTION OF THE PREFERRED EMBODIMENT

Figures 1, 4:
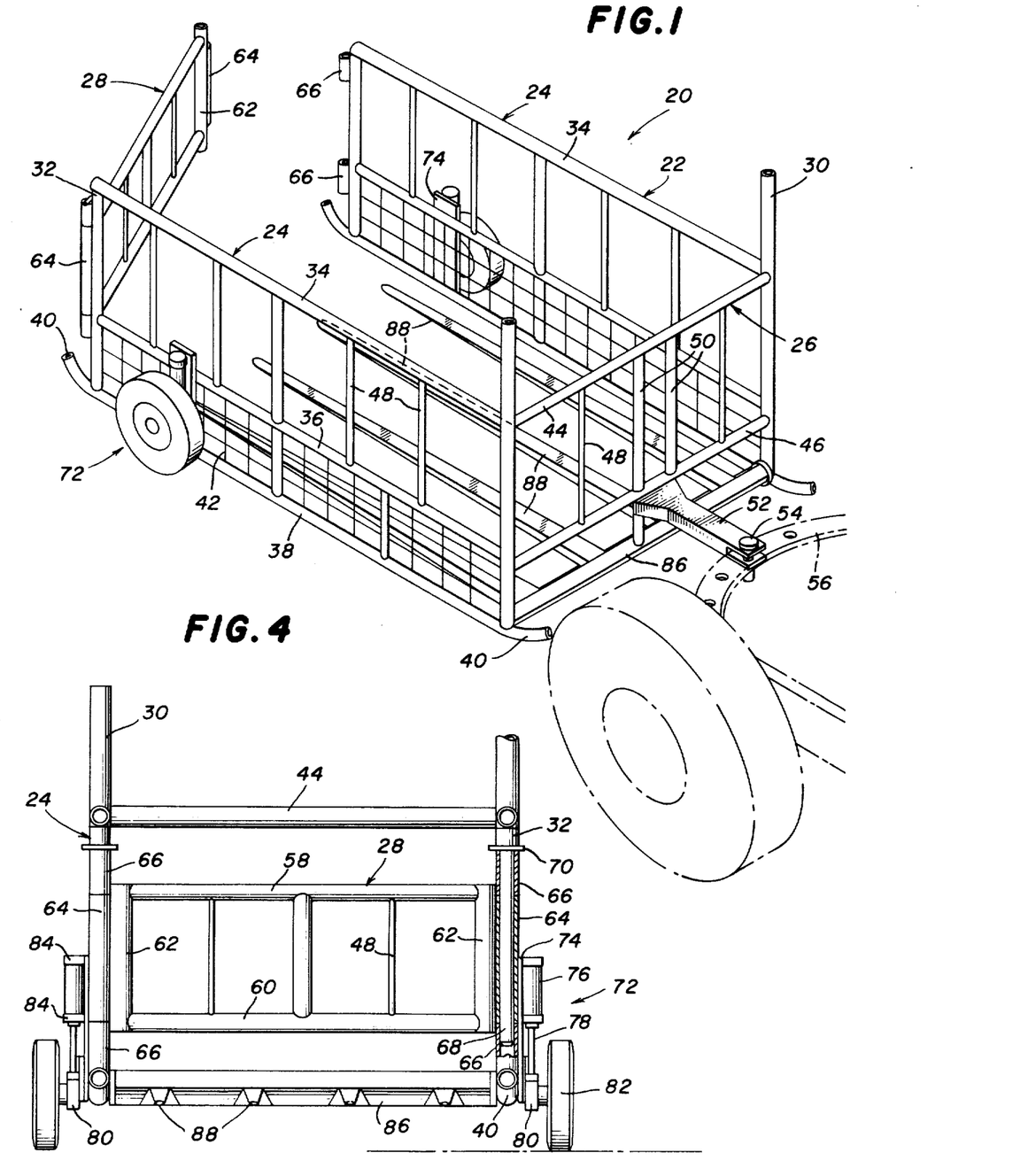
FIG. 1 is a perspective view of the preferred embodiment of the transporting and self-feeding apparatus of this invention, with the rear gate partially opened, and with a tractor-type drawing implement to which the invention is attached shown in phantom.
FIG. 4 is a slightly enlarged rear view of this invention with the rear gate closed, parts broken away, and parts not shown for simplicity.
Figure 2:
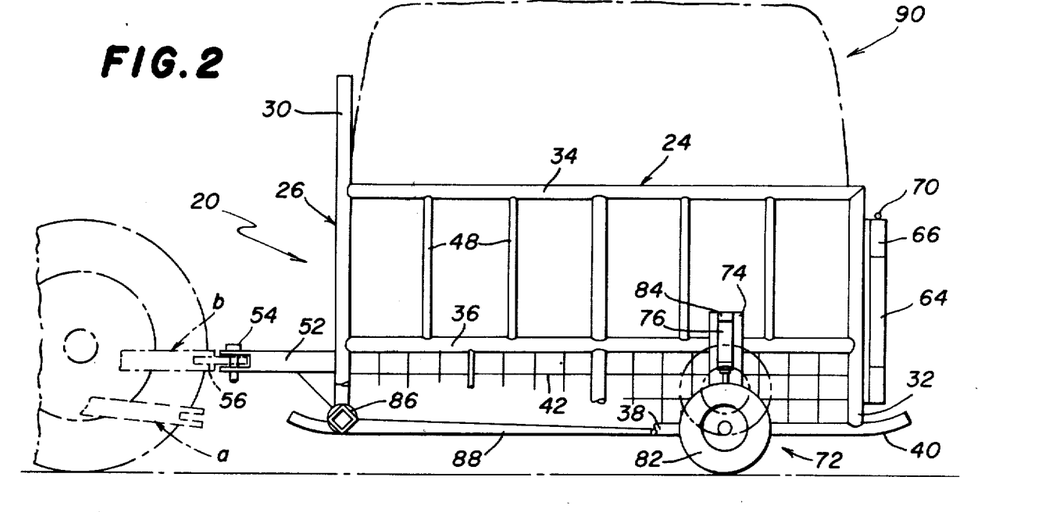
FIG. 2 is a side view of the apparatus depicted in FIG. 1, with some parts broken away and with others in phantom, and with a large compacted haystack shown in phantom.

As best shown in FIG. 1, the large haystack moving and self-feeding apparatus of the preferred embodiment of this invention is denoted generally by reference number 20. A rigid, rectangular-shaped feeder frame, generally denoted by reference number 22, comprises two identical, vertical side walls 24, 24, a front wall 26, and a rear gate wall 28. All walls are preferably made up of tubular metal stock and fabricated by well-known methods, such as by welding and brazing. Each vertical side wall 24 is provided with a front corner post 30, rear corner post 32, upper side support 34, intermediate side support 36, and sled runner 38 having upturned portions 40 at each end thereof. As best shown in FIGS. 1 and 2, wire screen 42 is permanently fastened along the entire lengths of sidewalls 24, 24 in the lower regions thereof.

Each vertical side wall 24 is rigidly connected in right angle relationship to front wall 26, the latter comprising upper cross member 44 and lower cross member 46. Stanchions 48 are rigidly connected in vertical orientation between upper and intermediate side supports 34, 36 of vertical side walls 24, and between upper and lower cross members 44, 46 of front wall 26. Vertical support members 50, 50 are rigidly fixed between upper and lower cross members 44, 46 on front wall 26 and extend below lower cross member 46. A short tongue 52 is rigidly supported between vertical support members 50, 50 and terminates in a yoke configuration for connection to a hitch of a tractor-type vehicle in the well-known manner as by utilizing a drop pin 54 through mating holes of tongue 52 and the tractor's drawbar 56.

Referring now to FIG. 4, rear gate 28 comprises upper and lower gate struts 58, 60, respectively, and end columns 62, 62. Rigidly fastened to each end gate column 62 is a tubular hinge member 64. Plural hinge sections 66 are fastened, one each, to the upper and lower ends of each rear corner post 32 in such vertical alignment such that when rear gate wall 28 is placed into position, a hinge pin 68 can be dropped down through hinge sections 66, 66 and hinge member 64. A restraint tab 70 is formed across the top of hinge pin 68 to prevent the latter from dropping through the vertically-aligned hinge tube sections.

Mounted on each side wall 24, preferably in the lower and rear regions thereof as best shown in FIGS. 1 and 4, are height-adjustable wheel assemblies, generally denoted by reference number 72. For purposes of this description, it will be understood that the term rear means the area around rear gate 28, and lower means the area adjacent sled runner 38. Moreover, like reference numerals denote like elements. A mounting plate 74 is securely fastened between intermediate side support 36 and runner 38 on sides thereof outward from the enclosure formed by feeder frame 22. Each height-adjustable wheel assembly 72 comprises a hydraulic cylinder 76, a hydraulic ram 78 which terminates in an axle connection bracket 80, and a wheel 82. The hydraulic cylinder 76 is connected to mounting plate 74 via plural securement collars 74 in any well-known manner, such as by threaded fasteners. Preferably, hydraulic hose lines (not shown) connect each hydraulic cylinder 76 to the secondary hydraulic system of a typical farm tractor in known manner. However, it will be understood that hydraulic cylinders 76, 76 can be manually activated.

A structural support beam 86 (FIGS. 1 and 4) is permanently fastened in horizontal relationship between each side wall 24 at the fixed junction of front corner post 30 and sled runner 38. Also connected to structural support beam 86 are the lowermost ends of vertical support members 50, 50 of front wall 26. Plural lift tongues 88 (FIGS. 3 and 4) are rigidly connected, such as by welding, to structural support beam 86 and extend rearwardly thereof in the same horizontal plane within which both sled runners 38 lie.

As best seen in FIG. 2, wheel assemblies 72 can take either of two extreme operating positions, depending upon the length of extension of ram 78 from cylinder 76. The position shown in solid lines represents that position taken by the wheel 82 when the hydraulic ram 78 is extended fully from hydraulic cylinder 76 (wheel assembly 72 is lowered), and the position shown in phantom is that position taken when hydraulic ram 78 is in its contracted condition (assembly 72 is raised). It can be readily noted that if wheel assemblies 72 are extended downward, and the tractor's drawbar 56 is raised from its normal operating position (shown by reference letter *a* in FIG. 2), the moving and feeding apparatus 20 of this invention is in a raised operating position, ready for movement.

Accordingly, when a cattle feeder desires to pick up and transport a pre-formed large haystack from a storage area, or in the field where produced, he backs a farm tractor up to the front end of mover and feeder apparatus 20 and connects tongue 52 to the drawbar 56 of his tractor. Desirably, drawbar 56 will be in lowered position *a* shown in FIG. 2 to engage with tongue 52 since wheel assemblies 72 will be in their raised position and sled runners 38, 38 and plural lift tongues 88 will correspondingly be resting on the ground. After connection to apparatus 20, the cattle feeder will raise drawbar 56 to a position approximating *b*, and then extend wheel assemblies 72, 72 down to the ground, thereby resulting in raising feeder frame 22 to the road-hauling position, as shown in FIG. 2. The tractor operator will then pull the apparatus 20 to the desired stack storage area, wherein he will back apparatus 20 into position so that rear gate 28 faces the narrowest side face of a pre-formed stack, such as stack 90 shown in FIG. 2. Rear gate 28 is then swung open by removing either of the two hinge pins 68, and swinging rear gate 28 about the other hinge pin 68. The operator then lowers the sled runners 38, 38 and the plural lift tongues 88 of feeder frame 24 onto the ground by raising wheel assemblies 72, 72 and by lowering drawbar 56 to position *a*. This places the apparatus 20 in a position to allow the lift tongues 88 to be forcibly rammed under stack 90 by the aligned backing of the tractor and the attached apparatus 20 toward the stack 90. The upturned portions 40 of sled runners 38, 38 permit feeder frame 22 to be rammed under stack 90 without digging into the ground and snagging thereon. Although some feed materials located in the lowermost levels of a pre-formed stack may be torn away from their surrounding compacted portions, very little damage is done to the overall integrity of the stack during its loading into apparatus 20.

Once a stack is loaded, it is in a position to be both raised and transported intact, since it is under-supported by plural lift tongues 88 and receives side support from side walls 24, 24, front wall 26, and gate 28. Rear gate 28 is then swung back to its closed position and the removed pin 68 is put in place. The tractor operator then effects lowering of the wheel assemblies 72, which can be by providing hydraulic pressure through hydraulic lines (not shown) to the hydraulic cylinder 76, or by manually hand-jacking each individual cylinder. It is to be understood that the hydraulic cylinder 76 and ram 78 may be replaced by well-known mechanical jack assemblies to effect raising and lowering of wheels 82 of the frame 22, since the latter is the important function required. Lowering the wheel assemblies 72, 72 causes the rear portions of feeder frame 22 to elevate with the associated stack 90. The operator also raises drawbar 56 to position b which correspondingly raises front tongue 52 and the front portions of feeder frame 22 in the associated stack 90. Once the front and rear portions of the apparatus have been raised to a position approximating that depicted in FIG. 2, the operator is ready to road haul apparatus 20 and stack 90. It should be noted that it is not important in which manner the stack and frame are raised, viz., whether drawbar 56 is first raised, or alternatively, whether wheel assemblies 72, 72 are extended downward. Both operations may, of course, be done simultaneously if the tractor has sufficient power to do so.

Once apparatus 20 and stack 90 are hauled to the desired feeding position, wheel assemblies 72, 72 are raised and the drawbar 56 is lowered so that sled runners 38 and lift tongues 88 are re-engaged with the ground. Drop pin 54 is removed and the tractor pulled away thereby leaving apparatus 20 and the associated stack 90 in place for animals to self-feed. The stanchions 48 are so positioned around the circumference of feeder frame 22 that only the head and shoulder portions of feeding cattle can be placed within the opening between adjacent stanchions 48. In this manner, cattle are only allowed to feed from the stack, not move in on top of it. Furthermore, the placement of wire screen 42 along the lower regions of side walls 24, 24 prohibits the hooves and legs of the cattle from entering the lower regions of stack 90. The above two factors substantially eliminate trampling waste problems found in current attempts at feeding large, preformed haystacks to a herd of cattle. Once the cattle have devoured the haystack 90, as much as possible, the apparatus 20 can be picked up by the tractor operator and reloaded with another haystack.

Although the overall cost of this invention is substantially less than that of the current, two-apparatus feeding and moving teachings, it is possible to further reduce the overall cost of apparatus 20 by providing wheel assemblies 72 that are removable from feeder frame 22. This can be done in any well-known manner such as by dismounting hydraulic cylinder 76 from mounting plate 74 via the release of plural securement collars 84. In this manner, one set of hydraulic wheel assemblies 72 can be utilized with several feeder frames 22.

Figure 7:
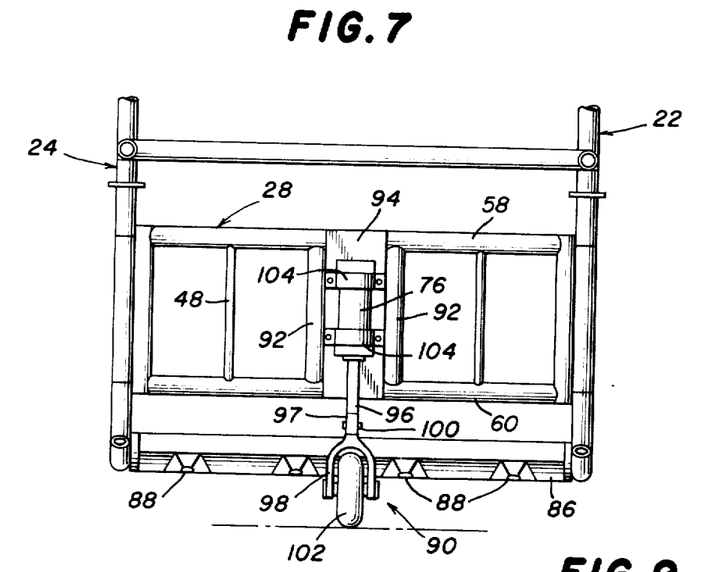
FIG. 7 is a rear view of a modified form of the preferred embodiment of this invention.
Figures 8, 9:
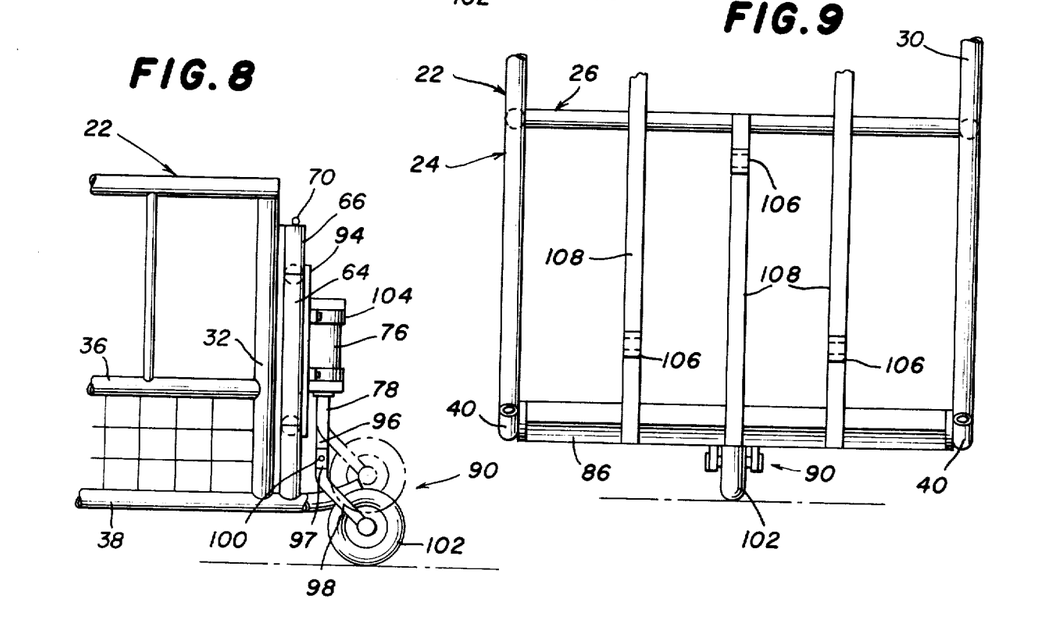
FIG. 8 is a partial side view of the modified form of FIG. 7.
FIG. 9 is a front view of the apparatus shown in FIG. 8.

A modified form of the preferred embodiment of this invention is shown in FIGS. 7, 8 and 9. Here, a unitary wheel assembly 90 replaces the wheel assemblies 72, 72 of the preferred embodiment of this invention as shown in FIGS. 1, 2, 3 and 4. As shown in FIG. 7, rear gate 28 is modified to include two support columns 92, 92, which are rigidly connected between upper and lower gate struts 58, 60. A mounting plate 94 is rigidly mounted between support columns 92, 92 and between upper and lower gate struts, 58, 60. The hydraulic cylinder 76 is rigidly connected to mounting plate 94 and extending therefrom is a hydraulic ram 78 modified to include an internally bored end 96. One end of a bent yoke axle assembly 98 is inserted into swivel 97 (which is permanently but rotatably carried within the internally bored end 96 of hydraulic ram 78) and then pin-connected via pin 100. Wheel 102 is carried in a swivel-like manner by yoke assembly 98 to allow rotation of wheel 102 relative to frame 22 during turning movements thereof. Hydraulic cylinder 76 is capable of being demounted from mounting plate 94 by releasing collars 104 so that wheel assembly 90 can be removed from feeder frame 22 and used with other frames.

As best shown in FIG. 9, three connection brackets, generally denoted by reference number 106, are permanently fastened one each to the three vertical support members 108 on modified front wall 26. The well-known three-point hitch of a common farm tractor is then connected to the three connection brackets 106 by any well-known means.

Concerning the operation of this modified form of apparatus as depicted in FIGS. 7, 8 and 9, it should be noted that to effect ramming of apparatus 20 under and about haystack 90, rear gate 28 will be opened in a similar fashion as in the above-described operation, with wheel assembly 90 being raised to its uppermost, least extended position. After feeder assembly 20 is rammed under and about the haystack, rear gate 28 is closed and wheel assembly 90 is hydraulically extended downward. In like manner to the above-described operation, this action raises the rear portion of both apparatus 20 and of the associated stack. Simultaneously, or as nearly so as possible, the three-point hitch of the tractor is raised to place the feeder assembly 20 and associated stack 90 in a level road hauling position, such as that depicted in FIG. 6.

Figures 3, 5, 6:
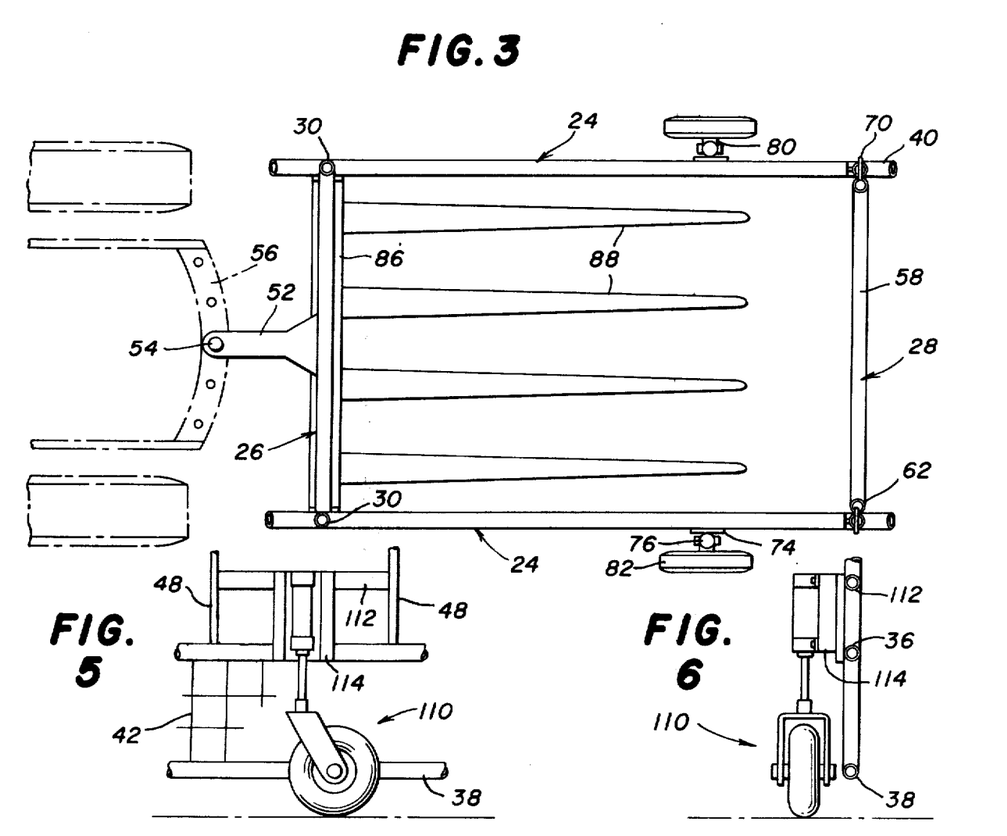
FIG. 3 is a plan view of the preferred embodiment of this invention.
FIG. 5 is a side view of an alternate type of wheel assembly for the preferred embodiment of FIG. 1.
FIG. 6 is a rear view of the wheel assembly of FIG. 5.

The three-point connection and unitary wheel assembly of this modified form of the invention (FIGS. 7, 8 and 9) will allow straight-line following of the farm tractor by apparatus 20, yet permitting turns via the swivel connection within wheel assembly 90. In contrast, the single point connection (via tongue 52) and dual wheel assembly of the preferred form of this invention (FIGS. 1, 2, 3 and 4) allows trailer-like turning and following of the apparatus 20 of the tractor. It is to be understood that either connection method and its respective form of wheel assembly can be utilized with the feeder frame of this invention. However, I find that it is easier to forcibly ram plural tongues 88 under stack 90 by utilizing the three-point connection method as more alignment control is available. On the other hand, if long road hauls of a stack are desired, I find that the single-point connection (tongue 52) is preferable. Also, a swivel side-wheel assembly, such as that denoted by reference numeral 110 as shown in FIGS. 5 and 6, can be utilized to replace each of the straight-line following wheel assemblies 72 of the preferred embodiment (FIGS. 1, 2, 3 and 4), if the operator desires to use a three-point hitch connection, such as that shown in FIG. 9. In that instance, so as to provide sufficient clearance room as each swivel side-wheel assembly 110 rotates when encountering turns, an additional support brace 112 is fastened between two adjacent stanchions 48 to provide support for block 114, which carries the hydraulic cylinder of the swivel wheel assembly 110, block 114 being used to block out assembly 110 from frame 22.

Figures 10, 12:
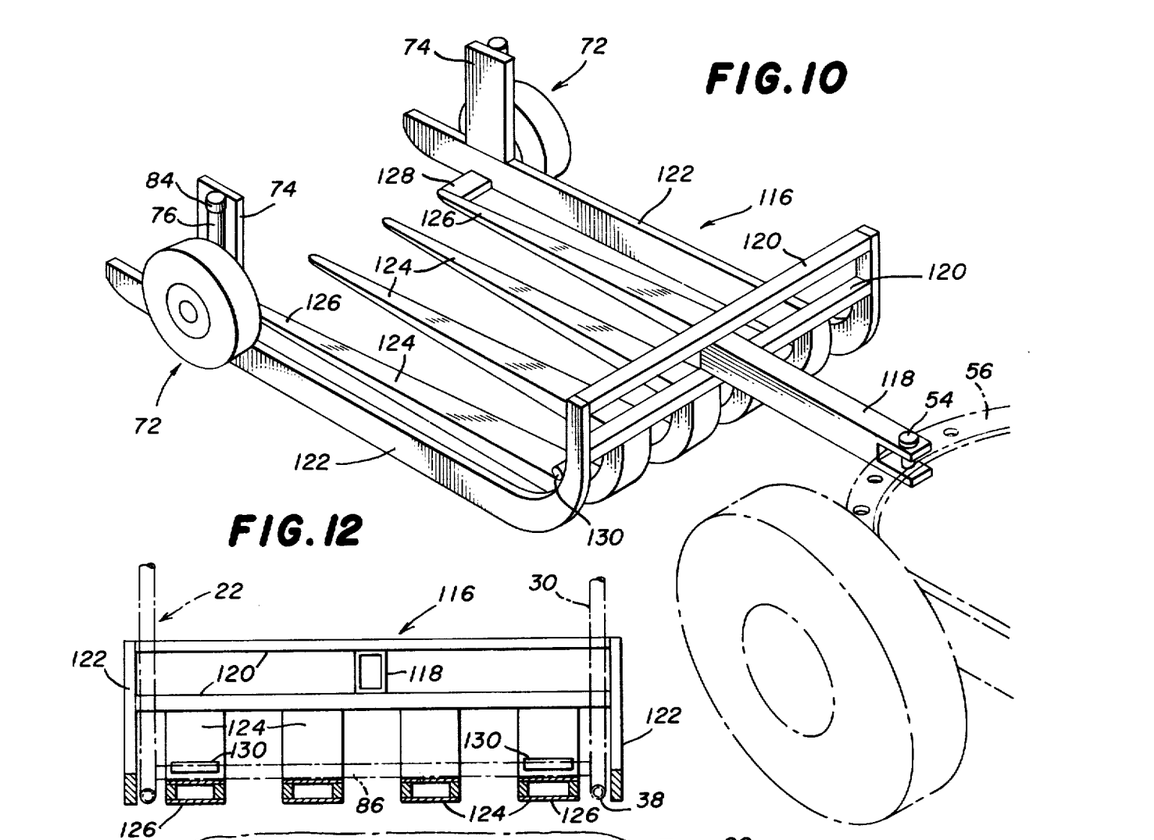
FIG. 10 is a perspective view of a second embodiment of this invention, and showing the separable moving element thereof.
FIG. 12 is a horizontal sectional view taken substantially along the line 12—12 in FIG. 11, showing the interconnection of the moving and feeder elements of this second embodiment, the latter being shown in fragmentary phantom.
Figure 11:
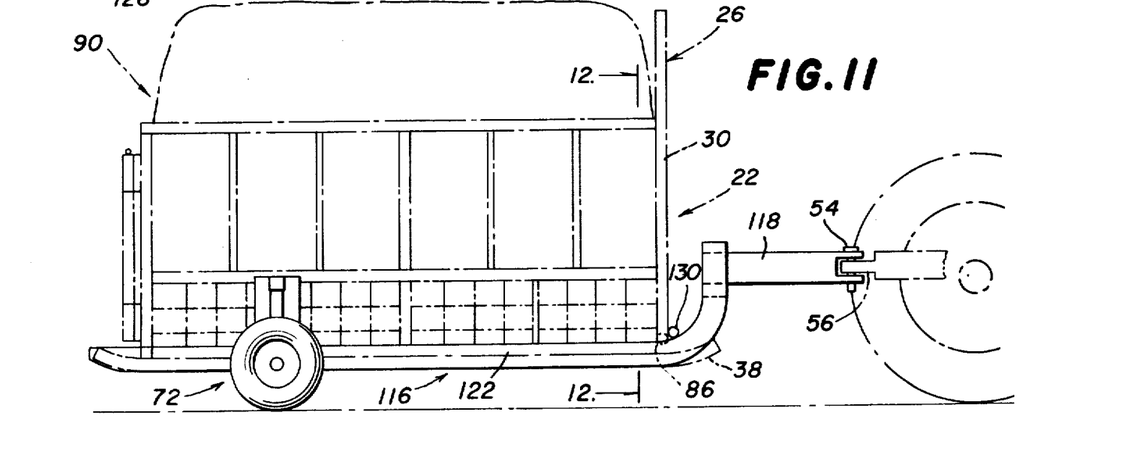
FIG. 11 is a side view of both the feeder and moving elements of the second embodiment of FIG. 10.

FIGS. 10, 11, and 12 depict a second embodiment of this invention having separable moving and self-feeding elements. FIG. 10 shows the separable moving element, generally denoted by reference number 116, resting on the ground and attached to a farm tractor's drawbar as shown in phantom. Moving element 116 comprises a sturdy tongue member 118, lateral support members 120, and structural side braces 122. Rigidly attached to structural side braces 122 is a mounting plate 74 carrying a height-adjustable wheel assembly 72, as previously described. Plural curved lift tongues 124 are rigidly attached to the lower lateral support member 120 and extend rearwardly of the tongue 118. The tip of each side tongue 126 of the plural support tongues 124 is attached to and supported by bracket 128 which is permanently fixed to the inside lower edge of each of the structural side braces 122. The function of this bracket 128 will be described later.

As best seen in FIGS. 11 and 12, separable moving element 116 can be interconnected with feeder frame 22 to provide pick-up, transportation, and unloading of a haystack 90 and feeder frame 22 at the desired feeding location. The operator backs moving element 116 up to the front wall 26 of a feeder frame 22, then lowers tongue 118 via tractor drawbar 56, and raises wheel assembly 72, thereby lowering moving element 116 to the ground. He then forcibly backs moving element 116 underneath feeder frame 22. The front end of feeder frame 22 is slidingly guided by and raised onto moving element 116 via frictional sliding engagement between structural support beam 86 and plural curved lift tongues 124, while the rear portion of frame 22 is supported by frictional engagement between sled runners 38 and brackets 128. It is apparent that feeder frame 22 will slide forward on plural lift tongues 124 until structural support beam 86 jams against stopbars 130, one each being welded to each side tongue 126.

The operator, after so frictionally interconnecting moving element 116 and feeder frame element 22, then lifts this combination via above-described methods, moves to the desired haystack, and proceeds to back this feeder and mover element combination forcibly under and around the stack, as above-described. Transportation and feeding of the stack are similar to that above-described. However, the primary advantage of this embodiment is the separability of the feeding and moving elements, wherein one moving element is capable of providing support for any number of feeder frame elements. This is because once the combination feeder and mover apparatus has moved the stack into position, the operator merely slidingly extracts and disconnects the moving element from under the feeder frame element and the enclosed stack and proceeds to a new frame element. The stack and feeder element are left in place for the cattle to self-feed.

Figure 13:
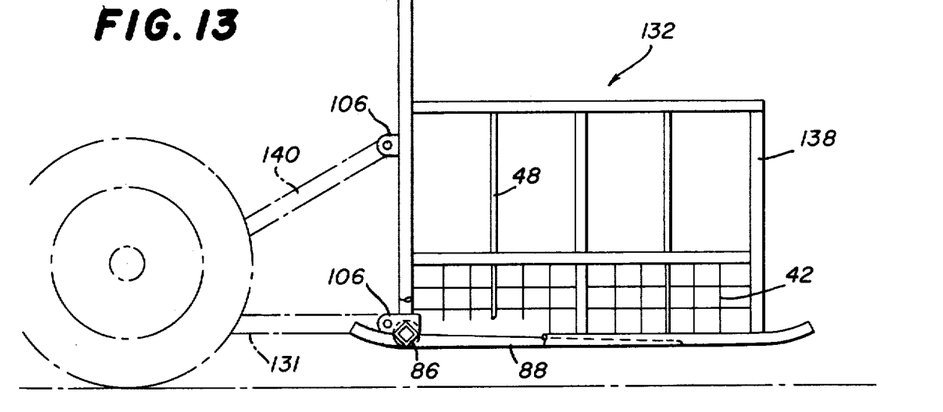
FIG. 13 is a side view of still a third embodiment of this invention.
Figures 14, 15:
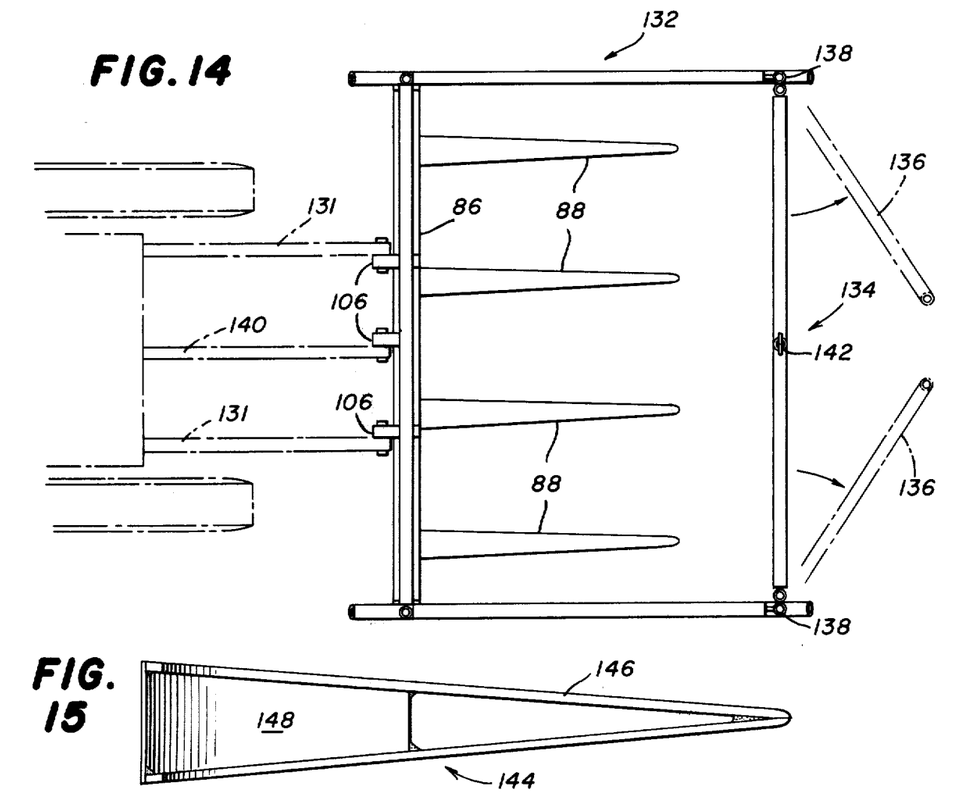
FIG. 14 is a plan view of the third embodiment, and showing the rear gates partially opened.
FIG. 15 is an enlarged plan view of a modified type of extended lift tongue usable with any embodiment of this invention.

Referring now to FIGS. 13 and 14, there is shown a still third embodiment of this invention wherein the feeder and mover apparatus is tractor-supported. No height-adjustable wheel elements are required to be mounted at the rear portions of the feeder element of this embodiment to provide lifting and moving support to the frame and associated stack. Rather, the tractor's power lifting means provides height-adjustment to the frame and stack. This is made possible because the center of gravity of the feeder frame and associated stack of this embodiment is moved closer to, and thus within the maximum lifting range of, the axis of rotation of the power arms 131 of the tractor's three-point hitch arrangement, than in previous embodiments. Obviously, the tractor must be of a sufficient capacity and size to be able to self-lift the frame and stack, the latter preferably being of the smallest preformed type. It should be noted that the plural lift tongues 88 of the feeder frame of this embodiment, generally denoted by reference numeral 132, albeit extending rearwardly of the tractor, extend along the narrowest dimension of frame 132, and not along the longest dimension as in feeder frame 22 (FIGS. 1, 2 and 3), and accordingly, the stack is loaded transversely, not longitudinally as with the preferred embodiment. Moreover, the rear gate 132 is separable into two gate sections 136, each gate section 136 being pivotable about a rear corner post 138.

In operation, this third embodiment as shown in FIGS. 13 and 14 works similarly to the previously-described two embodiments of this invention, except for the fact that the tractor operator need only effect lifting and height adjustment via operation of the tractor's three-point hitch arrangement, the latter being typically comprised of power lift arms 131 and stabilizer arm 140. Once the associated stack is loaded via ramming and lifting, rear gate sections 136 can be closed and pin-connected via drop bolt 142.

Figure 16:
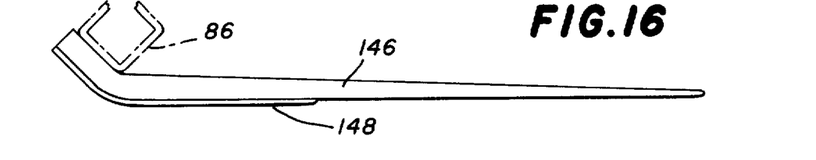
FIG. 16 is a side view of the modified lift tongue of FIG. 15 and showing specialized deflection shield means.

Referring now to FIGS. 15 and 16, there is shown a specialized shielded tongue assembly 144 formed of side tongue elements 146 which are rigidly fastened at their common end, such as by welding, and a deflection shield 148. In use, several shielded tongue assemblies 144 can be rigidly fastened to the front wall of a feeder frame of this invention, such as by welding to structural support beam 86. When placed relatively close to one another to provide lifting and moving support to a large haystack, assemblies 144 are useful in protecting and shielding the front lower edge of the associated haystack during forward movement of same, especially when the rear wheels of a tractor or the height adjustable wheel assemblies of the feeding and moving apparatus of this invention drop down, such as in a rut in the road or in a hayfield.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being merely preferred and alternate embodiments thereof.

The embodiments of the invention in which an exclusive property or privilege is claimed are defined as follows:

1. Apparatus for effecting moving and self-feeding of large compacted haystacks, comprising in combination: a rigid, rectangular-shaped feeder frame assembly, at least one side thereof having a plurality of vertical bars spaced to receive the head and neck of feeding animals between adjacent bars, said frame assembly further characterized by having one side thereof hingedly connected to at least one of its adjacent sides to allow placement of said frame around a large compacted haystack comprising loose feed materials for effecting self-feeding of said haystack; separable moving means operable to be slidingly, frictionally interconnected to said feeder frame assembly, said separable moving means comprising structural support means for providing rigid support to said feeder frame assembly once interconnected thereto during lifting and moving of said haystack; height-adjustable, ground-engaging wheel means carried by said structural support means and operable to effect raising and lowering of said interconnected structural support means and feeder frame assembly; implement connection means for connecting said structural support means to a drawing vehicle; plural tongue means rigidly connected to said structural support means and operable to slide under said feeder frame assembly when said height-adjustable, ground-engaging wheel means are in retracted condition, whereby said feeder frame assembly frictionally interconnects to said structural support means of said separable moving means through said plural tongue means, said plural tongue means further characterized by being operable to undersupport said haystack when thrust thereunder, said tongue means being spaced sufficiently close enough to prevent substantial loss of said loose feed material therebetween during said undersupporting; whereby the moving and self-feeding apparatus is operable to liftingly support and movably transport said haystack within said frame assembly after said separable moving means and interconnected feeder frame assembly have been respectively forcibly thrust under and placed around said haystack, and said height-adjustable, ground-engaging wheel means have been extended sufficiently to effect lifting of said interconnected structural support means and feeder frame assembly and said undersupported haystack, the separable moving means further characterized as being detachable from said feeder frame assembly for use with other feeder frame assemblies.

* * * * *